United States Patent [19]

La Vance et al.

[11] 4,234,924
[45] Nov. 18, 1980

[54] METHOD OF INTRODUCING A BASELINE MEASUREMENT INTO ELECTRONIC POSITIONING APPARATUS

[75] Inventors: Cecil N. La Vance, Paradise Valley; Allan A. Beale, Scottsdale, both of Ariz.

[73] Assignee: Motorola, Inc., Schaumburg, Ill.

[21] Appl. No.: 940,913

[22] Filed: Sep. 11, 1978

[51] Int. Cl.³ .............. G06F 15/50; G01S 5/14; G01S 13/08
[52] U.S. Cl. .............. 364/460; 244/136; 343/6.5 LC; 364/449
[58] Field of Search .............. 244/136, 175; 364/443, 364/449, 460; 343/6.5 LC, 6.5 R, 107, 108, 112 R, 112 TC

[56] References Cited

U.S. PATENT DOCUMENTS

| | | | |
|---|---|---|---|
| 2,599,889 | 6/1952 | Biggs et al. | 364/449 |
| 2,932,023 | 4/1960 | Haskins | 343/107 |
| 2,941,753 | 6/1960 | Ripper | 343/108 |
| 3,104,390 | 9/1963 | Pruess | 343/107 |
| 3,150,372 | 9/1964 | Groth, Jr. | 364/452 |
| 3,659,085 | 4/1972 | Potter et al. | 364/449 |
| 3,810,179 | 5/1974 | Merrick | 343/6.5 LC |
| 3,821,523 | 6/1974 | Chisholm et al. | 364/460 |
| 3,864,662 | 2/1975 | David et al. | 343/6.5 R |
| 3,959,793 | 5/1976 | Litchford | 343/6.5 LC |
| 3,979,057 | 9/1976 | Katz et al. | 364/443 |
| 4,128,835 | 12/1978 | Russell | 343/6.5 LC |

Primary Examiner—Felix D. Gruber
Attorney, Agent, or Firm—Eugene A. Parsons

[57] ABSTRACT

In electronic positioning apparatus, especially for use with airplanes, including a radar for periodically measuring the distance of the apparatus from each of two spaced apart reference stations and for continuously computing the position of the apparatus relative to the two reference stations with the use of a known baseline between the two stations, a method of determining the length of the baseline and introducing the information to the apparatus including positioning the apparatus over one of the two reference stations and utilizing the apparatus to measure the distance, storing the measured distance in a memory readable by the computing portion of the apparatus and electrically connecting the memory to the apparatus for use in computing the position of the apparatus.

3 Claims, 4 Drawing Figures

METHOD OF INTRODUCING A BASELINE MEASUREMENT INTO ELECTRONIC POSITIONING APPARATUS

BACKGROUND OF THE INVENTION

In general, radar tri-lateralization position locators are utilized in navigation and the like to determine the position of ships relative to two or more fixed shore stations. The baseline or distance between the two stations must always be included in the position calculations. In these types of prior art devices the shore stations are never moved and, may include, a relatively large number of stations positioned along a shore or navigation course so that a ship may use signals from different stations along its course to determine its position. Only two stations are used in each calculation and, since the stations are permanently positioned at known locations, the distance between these stations is always known and can be readily included into the computations.

When a radar electronic positioning system is utilized for guiding airplanes, for example, in crop dusting, spraying forests, or in any other applications where a uniform flight pattern is required, reference stations must be set up for each operation and the distance between the reference stations (the baseline) is not always readily available. For example, if a large area of forest is to be sprayed, it may be necessary to set the reference stations on the peaks of two hills. In this instance it may be very difficult to determine the distance between the two reference stations. Further, because two reference stations are used the distance between these stations must be included in the computations for proper tri-lateralization. All of the known prior art requires an accurate knowledge of the distance between the reference stations and the introduction of this distance into the computations prior to the operation. Further, all of the known prior art systems utilize extremely complex apparatus which is very costly and requires much of the pilots time for setting up the operation and operating during the spraying or the actual flight.

SUMMARY OF THE INVENTION

The present invention pertains to a method of setting up an operation in electronic positioning apparatus utilizing two spaced apart reference stations wherein a control unit is provided having a keyboard and a multiple position switch with an associated memory for storing information, which memory is operatively connected to the positioning apparatus in a final position for use of the stored information during computations, the multiple position switch and keyboard being used in steps to enter the offset between parallel paths, a unique identifying code for each of the reference stations, the length of the baseline between reference stations and the length of the first path by operating an "enter" switch at two spaced apart points along the path. If the length of the baseline is not known, it can be entered by positioning the apparatus directly over one of the reference stations with the multiple position switch in the baseline position and by measuring the distance to the other reference station with the apparatus.

It is an object of the present invention to provide a new and improved method of setting up an operation for electronic positioning apparatus utilizing two spaced apart reference stations.

It is a further object of the present invention to provide a method of introducing information as to the length of the baseline or the distance between two spaced apart reference stations, into electronic positioning apparatus.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
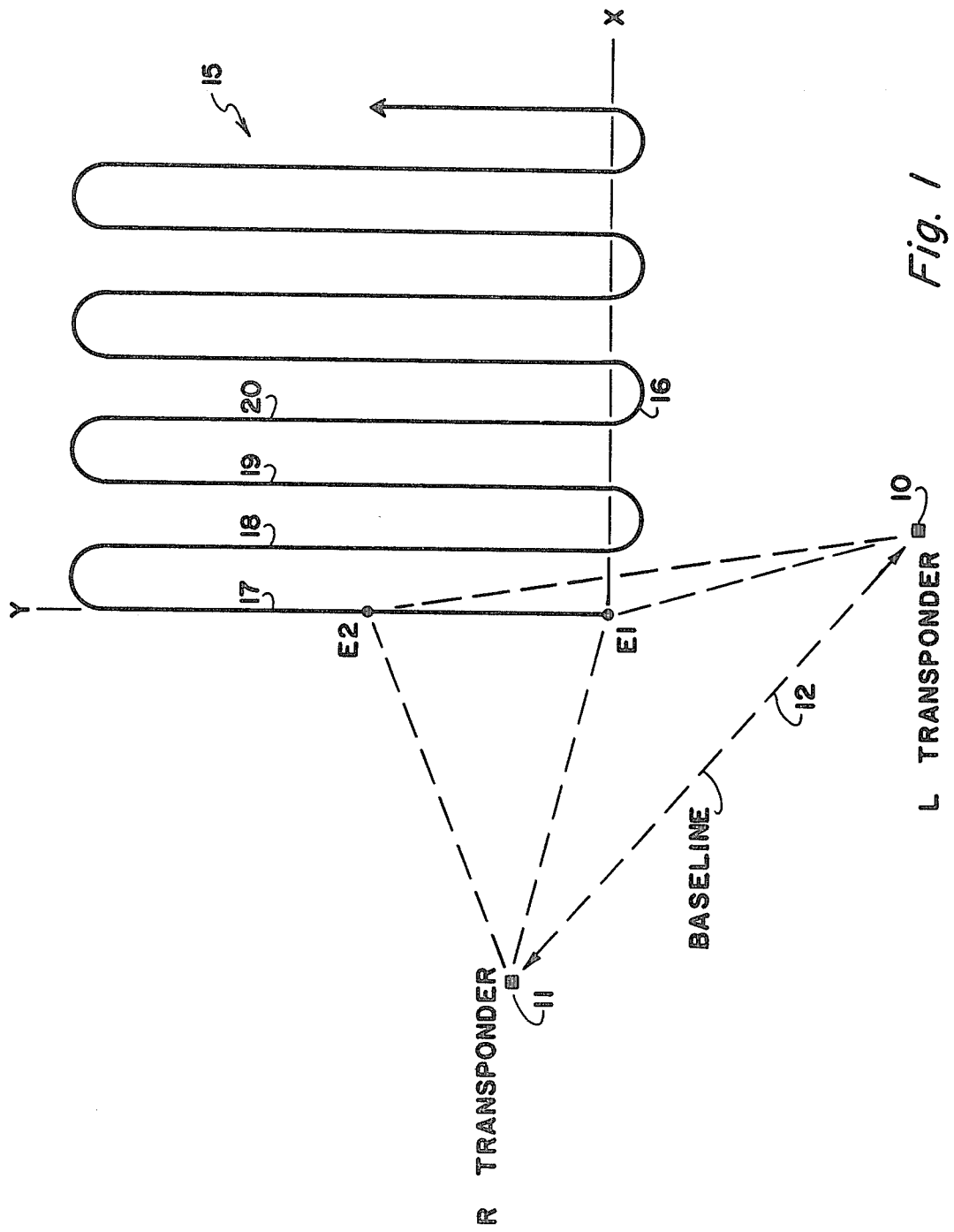
FIG. 1 is a plan view of a typical operation.

Referring specifically to FIG. 1, a plan view of a typical operation for crop dusting, forest spraying or the like is illustrated. A first or left transponder, as viewed front the area to be sprayed, is designated with the number 10. A second transponder, spaced from the transponder 10 by any convenient distance, is designated 11. The straight line between the transponders 10 and 11 is referred to as a base-line and is designated 12. The area to be dusted, etcetera, is generally designated 15 and a typical pattern 16, to be flown over the area, is illustrated in part. The pattern 16 consists of a plurality of parallel paths 17, 18, 19, 20, etc. The transponders 10 and 11 may be set up at any convenient location generally within the line of sight of the area 15.

Figure 2:
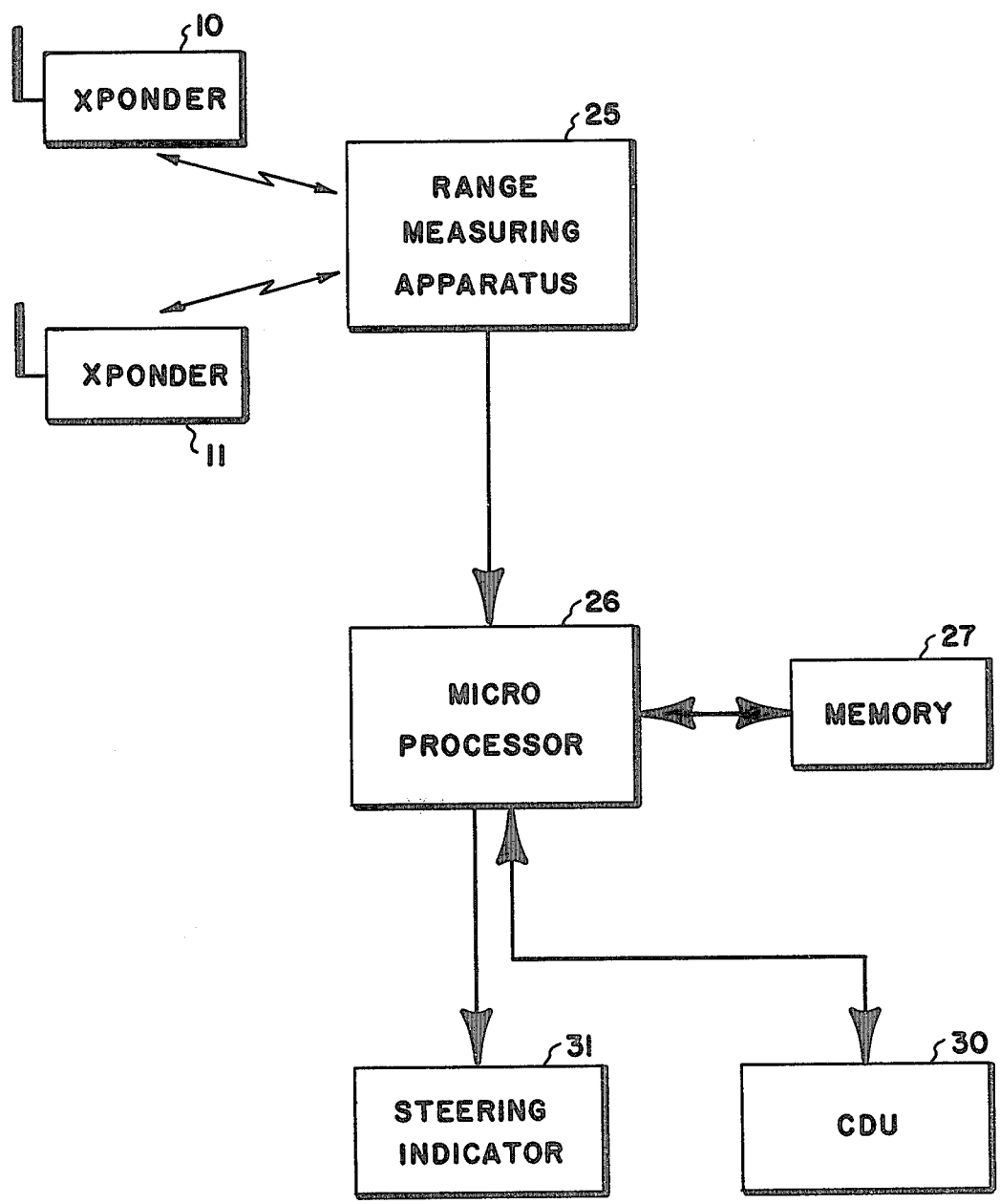
FIG. 2 is a simplified block diagram of electronic positioning apparatus.

Referring specifically to FIG. 2, a block diagram of typical electronic positioning apparatus is illustrated. The transponders 10 and 11 are associated with range measuring apparatus 25 which includes some type of radar operating at the frequence of the transponders 10 and 11 and which is capable of substantially continuously measuring the distance from the apparatus 25 to each of the transponders 10 and 11. The transponders 10 and 11 each transmit and receive with a unique identification code so that the range measuring apparatus 25 can differentiate between each of the transponders 10 and 11. In general, the radar of the apparatus 25 may be a continuous wave or pulsed radar and determines the range by measuring the time required for a signal to travel to the transponders 10 and 11 and for a signal to return from the transponders 10 and 11, in the well-known manner. It should be understood that the transponders 10 and 11 could be active or passive and it is only necessary that they operate in conjunction with the range measuring apparatus 25 to obtain range data throughout the area 15.

Figure 4:
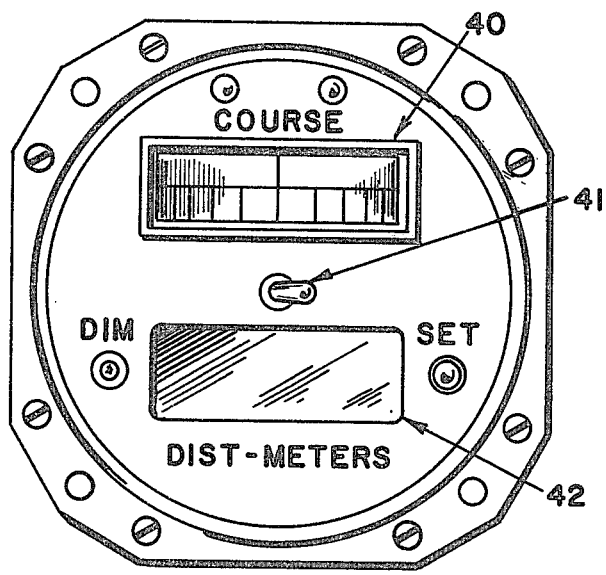
FIG. 4 is a plan view of the front panel of a steeering indicator unit.
Figure 3:
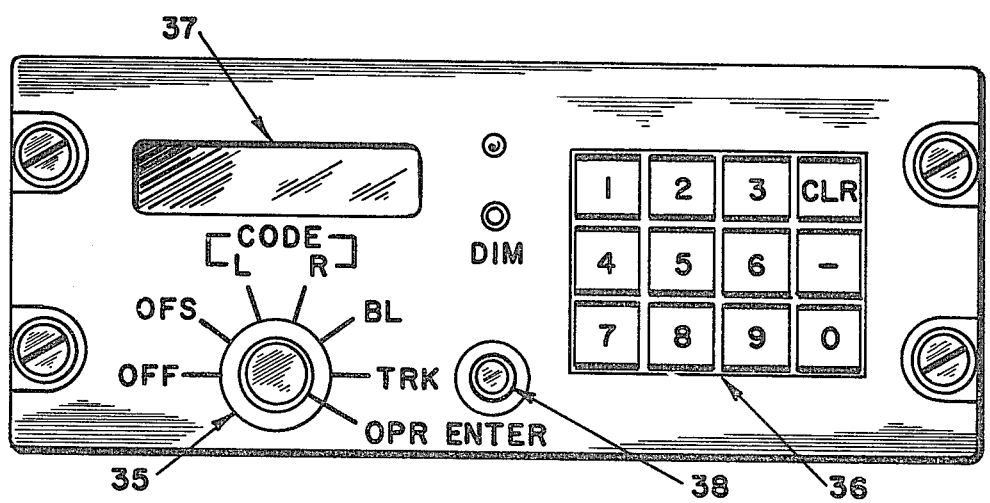
FIG. 3 is a plan view of a front panel for a control unit.

The range measuring apparatus 25 supplies range information to a microprocessor 26 which has a memory 27 associated therewith in a manner well-known to those skilled in the art. The microprocessor 26 also receives information from a control display unit (CDU) 30 and supplies information thereto. The front panel of the control display unit is illustrated in FIG. 3. Also, the microprocessor 26 supplies information to a steering indicator 31, the front panel of which is illustrated in FIG. 4. The microprocessor 26 and memory 27 are connected and programmed in a well-known manner to receive information from apparatus 25 and control/display unit 30 and to process this information and provide continuous steering indications to the indicator 31. Because these computations utilize standard arithmetic logic to solve well-known formulas and because the program may be set up in a variety of ways, a specific program will not be disclosed herein.

In the set up of a typical operation, such as that shown in plan view in FIG. 1, initial information required for the operation is entered into portions of the memory 27 through the microprocessor 26, in the usual fashion, by operating the control display unit 30 in the following manner. Referring to FIG. 3, a multiposition switch 35 is located on the front panel of the CDU and is initially operated by rotating the switch in a clockwise direction from an off position to a first offset position labeled OFS. With the multiposition switch 35 in the offset position the amount of spacing between parallel paths 17, 18, etc. is selected by operating comparable keys on a keyboard 36 also located on the front panel of the CDU. As the keys of the keyboard 36 are operated the selected offset distance appears in a display window 37. If the offset appearing in display window 37 corresponds with the desired offset, an "enter" button 38 can be depressed to enter the information into the memory 27.

The multiposition switch 35 is then rotated clockwise to the second position, designated L, which allows a specific unique identification code for the left transponder 10 to be entered into the memory 27 through the microprocessor 26. Each of the transponders 10 and 11 are preset internally with a unique identifying code so that the range measuring apparatus 25 can differentiate between the two. This unique identifying code must be entered into the memory 27 and used by the microprocessor 26 to differentiate between signals received so that the apparatus 25 "knows" which transponder 10 or 11 it is communicating with. With the switch 35 in position L the keyboard 36 is operated to select the code previously entered into the transponder 10 and this code appears in the display window 37. With the correct code illustrated in display window 37, the "enter" button 38 is depressed to enter the information into the memory 27. In a similar fashion the switch 35 is moved to the next position, designated R, and the code for the right transponder 11 is entered into the memory 27.

The next position of the switch 35 is designated BL and is used to enter information into the memory 27 as to the length of the baseline 12. Information as to the length of the baseline 12 can be entered into the memory 27 in two different ways. If the length of the baseline 12 is known, this information can be entered by way of the keyboard 36 and the enter switch 38. If the transponders 10 and 11 are situated so that the baseline 12 cannot be easily measured, for example on the crests of spaced apart hills, the length of the baseline 12 can be entered into the memory 27 as follows. As is normal when using a keyboard like the keyboard 36 in conjunction with a computer, a "clear" button, designated CLR, is provided and this button should be depressed first before selecting desired information, to clear the apparatus of previously selected information. In the present situation, with the switch 35 in the baseline position, the "clear" button is depressed and the pilot flies the plane so that it and the apparatus 25 are situated directly over one of the transponders 10 or 11. In this position the apparatus 25 is only supplying information to the microprocessor 26 as to the length of the baseline 12 because the distance to the transponder over which the plane and apparatus 25 are situated is substantially zero relative to the length of the baseline 12. With the apparatus 25 situated directly over one of the transponders 10 or 11, the operator depresses the "enter" button 38 so that the measured length of the baseline 12 is supplied from the apparatus 25 through the microprocessor 26 into the memory 27. Utilizing this method, baselines which would be extremely difficult and time consuming to measure can be quickly and easily introduced into the memory 27 without appreciable loss of time. Further, because this method is available to the person setting up an operation, the position of the transponders 10 and 11 is not as critical as it would be if an exact measurement therebetween were required in advance. Thus, additional time can be saved in setting up an operation because the transponders 10 and 11 can be positioned at literally any convenient position within the line of sight of the area 15.

The next position of the switch 35 is designated TRK and is used to enter information into the memory 27 as to the direction of the flight paths 17, 18, etc. With the switch 35 in the track position the pilot flies the airplane along the first path 17 and depresses the "enter" button as he passes over the point labeled E1 in FIG. 1. He continues to fly along the path 17 and again depresses the "enter" button 38 as he passes over the point E2, which is spaced from the point E1. In the operation illustrated in FIG. 1, the point E1 is at the beginning of the path 17, for convenience, but it should be understood that it is only necessary that the points E1 and E2 be spaced apart along the path 17 to correctly enter the direction information into the memory 27. The points E1 and E2 essentially define the Y axis in an XY coordinate system (see FIG. 1) and the point E1 defines the X axis. By locating the point E1 at the beginning of the path 17 the X axis passes through the beginning of the path and defines the beginning of each of the remaining paths 18, 19, 20, etc. A course meter 40 on the steering indicator 31 continually indicates to the pilot his direction relative to the Y axis of the XY coordinate system. Direction of the meter movement 40 may be reversed by a switch 41 each time there is a reversal in flight direction due to a change in flight paths, for example when the plane moves from flight path 17 to flight path 18. A distance indicator 42 is also supplied on the steering indicator 31 and continually supplies information as to the distance of the airplane from the X axis of the XY coordinate system. Thus, once the position of the two points E1 and E2 is entered into the memory 27 the switch 35 is moved to the final position, designated OPR, for continued operation.

Thus, an improved method of setting up an operation in electronic positioning apparatus is described which is greatly simplified over prior art methods and which includes an improved method for introducing the baseline information into the memory. The novel method of introducing the baseline information greatly simplifies the setup procedures and saves a great amount of time, since the two reference stations, or transponders, can be set at random spaced apart positions which are convenient for the desired operation. While we have shown and described specific apparatus and a specific method of utilizing this apparatus, further modifications and improvements will occur to those skilled in the art. We desire it to be understood, therefore, that this invention is not limited to the particular method described and we intend in the appended claims to cover all modifications which do not depart from the spirit and scope of this invention.

What is claimed is:

1. In conjunction with electronic positioning apparatus, including means for substantially continuously measuring the distance of the apparatus from each of two spaced apart reference stations and for substantially continuously computing the position of the apparatus relative to the two reference stations with the use of a baseline measurement between the two stations, a method of measuring a substantially inaccessible baseline and introducing the baseline measurement into the apparatus comprising the steps of:
   (a) positioning the apparatus over one of the two reference stations;
   (b) generating a signal indicative of a measurement of the baseline distance to the other of the two reference stations using the apparatus;
   (c) storing the distance signal in a memory readable by the apparatus; and
   (d) utilizing the stored signal in computing subsequent positions of the apparatus.

2. In conjuction with electronic positioning apparatus, including means for substantially continuously measuring the distance of the apparatus from each of two spaced apart reference stations each having a unique identification code and for substantially continuously computing the position of the apparatus relative to the two reference stations with the use of a known baseline between the two stations and further including a control unit having a keyboard and an "enter" switch combination, a multiple position switch and an associated memory for storing information used by the positioning apparatus for computing the position, the keyboard being operatively connected to different portions of the memory by different positions of the switch and the memory being operatively connected to the positioning apparatus in a final position for use of the stored information during computations, a method of setting up an operation comprising the steps of:
   (a) moving the multiple position switch to a first position, operating appropriate keys of the keyboard corresponding with a desired amount of offset between adjacent parallel paths and entering the information in the memory by operating the "enter" switch;
   (b) moving the multiple position switch to a second position, operating appropriate keys of the keyboard corresponding with the unique identification code of one of the reference stations and entering the information in the memory by operating the "enter" switch;
   (c) moving the multiple position switch to a third position, operating appropriate keys of the keyboard corresponding with the unique identification code of the other of the reference stations and entering the information in the memory by operating the "enter" switch;
   (d) moving the multiple position switch to a fourth position, operating appropriate keys of the keyboard corresponding with the length of the baseline between the two reference stations and entering the information in the memory by operating the "enter" switch;
   (e) moving the multiple position switch to a fifth position for connecting the position computing apparatus to the memory through the "enter" switch, positioning the apparatus over a first point on a first path and operating the "enter" switch to enter the position information in the memory, and moving the apparatus along the first path to a second point on the first path spaced from the first point and operating the "enter" switch to enter the position information in the memory; and
   (f) moving the multiple position switch to the final position.

3. In conjunction with electronic positioning apparatus, including means for substantially continuously measuring the distance of the apparatus from each of two spaced apart reference stations each having a unique identification code and for substantially continuously computing the position of the apparatus relative to the two reference stations with the use of a known baseline between the two stations and further including a control unit having a keyboard and an "enter" switch combination, a multiple position switch and an associated memory for storing information used by the positioning apparatus for computing the position, the keyboard being operatively connected to different portions of the memory by different positions of the switch and the memory being operatively connected to the positioning apparatus in a final position for use of the stored information during computations, a method of setting up an operation comprising the steps of:
   (a) moving the multiple position switch to a first position, operating appropriate keys of the keyboard corresponding with a desired amount of offset between adjacent parallel paths and entering the information in the memory by operating the "enter" switch;
   (b) moving the multiple position switch to a second position, operating appropriate keys of the keyboard corresponding with the unique identification code of one of the reference stations and entering the information in the memory by operating the "enter" switch;
   (c) moving the multiple position switch to a third position, operating appropriate keys of the keyboard corresponding with the unique identification code of the other of the reference stations and entering the information in the memory by operating the "enter" switch;
   (d) moving the multiple position switch to a fourth position, positioning the apparatus over one of the reference stations, and operating the "enter" switch to connect the apparatus to the memory and enter the distance of the other reference station therein;
   (e) moving the multiple position switch to a fifth position for connecting the position computing apparatus to the memory through the "enter" switch, positioning the apparatus over a first point on a first path and operating the "enter" switch to enter the position information in the memory, and moving the apparatus along the first path to a second point on the first path spaced from the first point and operating the "enter" switch to enter the position information in the memory; and
   (f) moving the multiple position switch to the final position.

* * * * *